United States Patent [19]

Boeckmann

[11] Patent Number: 4,523,057

[45] Date of Patent: Jun. 11, 1985

[54] HIGH GAIN CASCODE AMPLIFIER WITH NEGATIVE FEEDBACK

[75] Inventor: Eduard F. B. Boeckmann, Huntsville, Ala.

[73] Assignee: GTE Business Communication Systems, Northlake, Ill.

[21] Appl. No.: 596,175

[22] Filed: Apr. 2, 1984

[51] Int. Cl.³ .............................................. H04N 1/60
[52] U.S. Cl. .................................. 179/81 B; 330/296; 330/311
[58] Field of Search ............... 179/100 L, 81 B, 81 A, 179/81 R, 111 E; 381/113, 95, 120; 323/303; 330/296, 311

[56] References Cited

U.S. PATENT DOCUMENTS 4,295,100 10/1981 Kraemer ........................ 330/311 X Primary Examiner—Gene Z. Rubinson
Assistant Examiner—James L. Dwyer
Attorney, Agent, or Firm—Robert J. Black; Gregory G. Hendricks

[57] ABSTRACT

An amplifier combining the properties of high gain, wide band audio response with input signal conditioning, constant current output for use on two wire systems and compound negative feedback for resistance to oscillation in acoustic feedback environments. The direct coupled amplifier combines a modified cascode stage with a composite connected transistor output stage. It is intended primarily for use in two wire communication of voice transmission such as in telephone handsets or telephone instruments.

9 Claims, 1 Drawing Figure

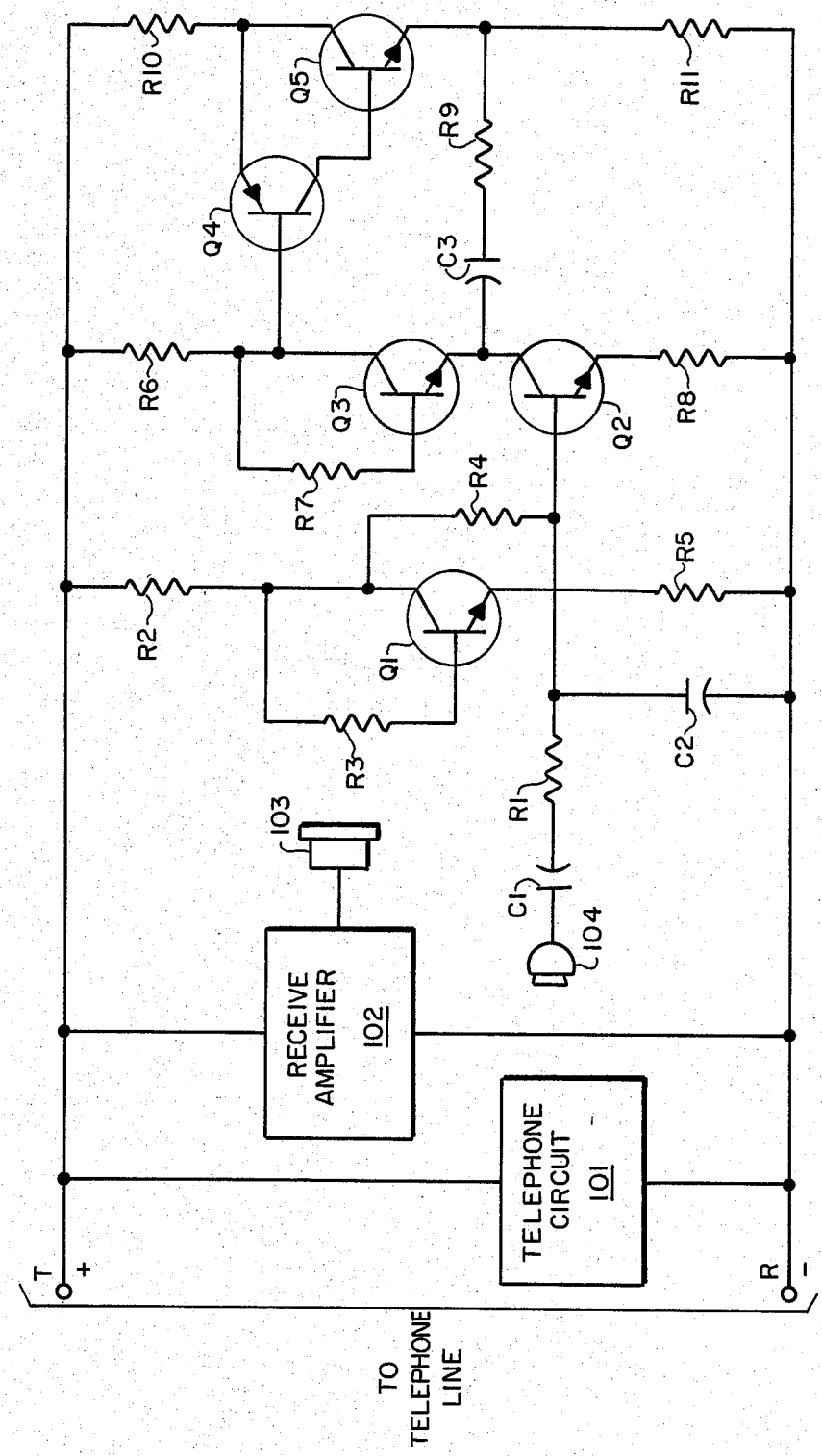

HIGH GAIN CASCODE AMPLIFIER WITH NEGATIVE FEEDBACK

CROSS-REFERENCE TO RELATED APPLICATION

This application is related to my pending application Ser. No. 490,769 filed May 2, 1983, now Pat. No. 4,491,689, and entitled "Amplifier For Use With Telephone."

BACKGROUND OF THE INVENTION

1. Technical Field

The present invention relates to amplifiers and more particularly to an amplifier for use with a telephone transmitter.

2. Background Art

Since the advent of telephones employing active gain circuitry many such units have found it expeditious to employ for the voice transmitter an electret microphone. Many different circuits have been devised to provide proper amplification for use with the electret as a transmitter. Most of the amplifier circuits employed have one or more disadvantages such as poor frequency response, effective operation only over a narrow range of supply voltage, a tendency to sing in response to acoustic feedback, susceptibility to radio frequency interference, incorrect impedance or current supervision properties. A number of the circuits developed act as voltage sources so that substantial signal loss occurs when the telephone is employed over a long loop, as opposed to those circuits wherein the amplifier acts as a constant current source. Some of the circuitry employed attempts to utilize only a minimum of transistors such as two or three to provide low cost implementation, but accordingly performance suffers as a result.

Recently a number of circuits have been employed which have been made into integrated circuit packages. They sometimes include some of the same problems as described above plus possible large variations in properties from one lot to the next of the integrated circuit units, resulting in a high yield loss and of course variable performance.

More recently new high quality but low cost telephones have been developed for the business and residential telephone subscriber. Quite frequently these units employ telephone transmitters of low output that require amplification of the voice signals picked up by the telephone transmitter. Often these telephone transmitters are of the electret type with an associated built in amplifier, pre-amplifier or buffer amplifier included in the handset or hand held telephone unit in which the telephone transmitter itself is located. The associated receiver also included in the same telephone handset or unit is usually a standard magnetic receiver and may or may not be driven by an associated amplifier. In such telephones the voice network may be located in the handset or the hand held unit or as an alternative may be located in the associated telephone base. Such network circuitry may be of the traditional coupled coil type or may employ an integrated circuit is so called inductorless designs.

Most of these telephones did not take into the account the hazard of feedback seen under certain sound reflective conditions, where output from the handset receiver may be picked up by the microphone and reinforcing the output of the receiver because of the normal side tone available in the voice network causes "singing."

"Singing" is defined as an oscillation that occurs usually in the frequency range of 2,000 to 3,000 Hz and is audible without holding the telephone receiver close to the subscriber's ear. This condition typically occurs only under extreme conditions when the handset is placed downward or in a reflective corner environment forming a type of resonant cavity around the microphone and the receiver.

Most previous designs have been found to have this objectionable "singing" characteristic under certain conditions, which can be transmitted over the telephone line to the other party. Early attempts to solve this problem resulted in a reduction in the transmit gain and loss of low frequencies as well as high frequencies. Obviously, such signal reduction is not desirable particularly if the transmitter is to be used on anything other than in a short loop environment. One method used to stop the singing involved, uses a feedback loop from the output of the telephone transmitter amplifier back to its input. This particular technique resulted in substantial loss in transmit level. Accordingly, it is the object of the present invention to provide a new and useful amplifier circuit for use with electret microphones in telephone instruments, which overcome problems and deficiencies outlined above.

SUMMARY OF THE INVENTION

The present invention consists of an amplifier circuit for use between a telephone transmitter and an associated telephone line, where the telephone transmitter employed is a microphone of the electret type. The present amplifier incorporates therein the techniques of phase shifting and a high frequency roll off band pass filter utilizing the source resistance of the telephone transmitter and the input resistance of the transistor stage that provides the necessary amplification, as elements in a band pass filter which provide the necessary high frequency roll off, to prevent feedback "singing."

Other components included which are required to complete the filter circuitry are a first capacitor which is connected between the microphone and the above noted transistor amplifier stage and a second capacitor between the transistor input stage and a common or ground connection of an associated power supply which provide the necessary potential for the amplifier circuitry. Additional resistance may also be included between the telephone transmitter and the first capacitor referenced above, if necessary to adjust the signal transfer function characteristic of the filter.

The telephone transmitter amplifier of the present invention employs a current mirror current source providing bias to the first stage of a modified cascode amplifier stage, i.e. the collector of the first transistor (of the NPN type) feeds a signal into the emitter of the second transistor of the cascode stage to obtain high gain and a high output resistance from the cascode stage. An important aspect of this invention is the modification of the standard cascode circuitry to include collector feedback to the base in the second transistor, and negative feedback into the emitter of the same transistor from the emitter of the output which is a transistorized composite pair.

This arrangement forms a cascode stage with compound negative feedback. The collector path in the second transistor also providing the necessary DC bias. The output stage of the amp consists of a composite transistor made up of a PNP transistor driver and an NPN output transistor. Another important aspect of this invention is the combination of the modified cascode amplifier and the composite driver and output stage connected in a direct coupled configuration for wide band response and with reduced Miller effect. High output impedance is also obtained. Another important feature of this invention is to use a resistor and capacitor in series from the emitter of the output transistor to the emitter of the second transistor of the cascode stage thereby injecting negative phase signal for negative feedback and adjusting input impedance of the circuit. Feedback of this type was found to be very effective in reducing audio feedback sing, contributing to the effect of the input filter network.

Accordingly, the present application combines the features of an input phase shifting and high frequency roll off network, a collector feedback modified cascode stage, phase shift feedback to the emitter of the second transistor of the cascode stage and the combination of the cascode stage with a composite output stage forming a wide band high impedance direct coupled amplifier with compound negative feedback.

BRIEF DESCRIPTION OF THE DRAWING

The single sheet of accompanying drawings is a combination block and schematic circuit diagram of a high gain cascode amplifier employing negative feedback in accordance with the present invention.

DESCRIPTION OF THE PREFERRED EMBODIMENT

Referring now to the accompanying drawing, a subscriber's telephone instrument circuit is shown. The conventional circuitry including ringing and dialing circuits, protective circuitry, etc. have been lumped together under telephone circuit as a block labeled telephone circuit 101 in as much as they do not form a portion of the present invention and their design would be well within the scope of one skilled in the art. Likewise, receive amplifier 102 which does not form a portion of the present invention is also shown as a block.

The transmit amplifier circuitry in accordance with the present invention is shown connected to the T and R (Tip and Ring) leads extending to a telephone line in the amplifier circuitry, a microphone 104 is coupled by input DC blocking capacitor and low frequency cutoff filter element, capacitor C1. Capacitor C1 in turn is coupled to the phase shift filter elements, resistor R1 and capacitor C2. A bias current source consisting of transistor Q1 and resistors R2, R3, R4 and R5 provide the necessary bias current through resistor R4 to the base of transistor Q2. The cascode stage consisting of transistors Q2 and Q3 and resistors R6, R7 and R8 receives its input at the base of transistor Q2 from the junction point of resistor R1 and capacitor C2. The output stage comprises a composite configuration consisting of transistors Q4 and Q5 and load resistor R10 and emitter resistor R11. Capacitors C3 and resistor R9 connected between the emitter of transistor Q5 and the junction between the collector of transistor Q2 and the emitter of transistor Q3, form a phase shift feedback network from the composite output stage to the cascode stage.

In operation, the input signal from the microphone 104 is conditioned by the input filter network consisting of capacitors C1 and C2 and resistor R1 and the input impedance of transistor Q2 in order to have the desired low and high frequency roll off and phase shift. Transistor Q1 provides a controlled bias current to the base of transistor Q2. Transistor Q2 and transistor Q3 form a cascode stage with its inherent properties of high gain, low Miller effect and high output impedance. A relatively high value of emitter feedback resistance provided by resistor R8 is used along with collector feedback from the collector to the base of transistor Q3 provided by resistor R7, to provide compound negative feedback in the cascode stage, thereby adding the properties of high DC stability along with the reduction of distortion due to the negative feedback. It should be noted that this feedback incorporated the cascode stage itself affects all frequencies within the amplifiers band width.

The cascode stage feeds the composite output stage. The two stages in combination are in effect a current amplifier providing a constant (AC signal) current source being the telephone line. The combination of the cascode stage in the composite output stage forming a constant current amplifier is an important part of the present invention in that the output level as seen at the central office termination remains relatively high regardless of loop length. Finally, higher frequencies are fed back from the emitter of the Darlington output stage via resistor R9 and capacitor C3 to the emitter of transistor Q3 in the cascode stage. As noted previously this feedback is negative and helps to control singing in the presence of audio feedback in a handset application. Such a feedback path also lowers the impedance of the amplifier. Since the impedance can be very high without this feedback loop, the loop can be used to adjust the impedance to a lower value just 600 ohms in order to match typical 600 ohmn systems.

It will be obvious to those skilled in the art that numerous modifications may be made without departing from the spirit of the present invention which shall be limited only by the scope of the claims hereto.

What is claimed is:

1. A subscriber's telephone instrument circuit connected to a telephone line and including a microphone and an amplifier connected between said microphone and said telephone line, said amplifier comprising:
   a cascode amplifier stage including an input and an output;
   a low frequency cutoff filter connected to said microphone;
   a phase shifting filter connected between said cutoff filter and the input of said cascode amplifier stage;
   a bias current source connected across said telephone line and including an output connected to said cascode stage; and
   a composite amplifier stage including an input connected to said cascode amplifier output and further including an output connected to said telephone line; whereby electrical signals generated by said microphone are amplified and subsequently conducted to said telephone line.

2. A subscriber's telephone instrument circuit as claimed in claim 1, wherein there is further included a phase shift feedback network connected between the output of said composite amplifier stage and said cascode amplifier stage.

3. A subscriber's telephone instrument circuit as claimed in claim 2, wherein said phase shift feedback network comprises a capacitor and a resistor connected in series.

4. A subscriber's telephone instrument circuit as claimed in claim 1, wherein said low frequency cutoff filter further functions to block flow of direct current.

5. A subscriber's telephone instrument circuit as claimed in claim 1, wherein said low frequency cutoff filter comprises a capacitor.

6. A subscriber's telephone instrument circuit as claimed in claim 1, wherein said phase shifting filter comprises an L network including a resistor and a capacitor.

7. A subscriber's telephone instrument circuit as claimed in claim 1, wherein said bias current source comprises a transistor connected across said telephone line and a resistor connected between said transistor and said cascode stage input.

8. A subscriber's telephone instrument circuit as claimed in claim 1, wherein said cascode amplifier stage comprises first and second NPN transistor collector-emitter paths serially connected across said telephone line.

9. A subscriber's telephone instrument circuit as claimed in claim 1, wherein said composite amplifier stage includes first and second transistors of complementary type.

* * * * *